June 19, 1928.

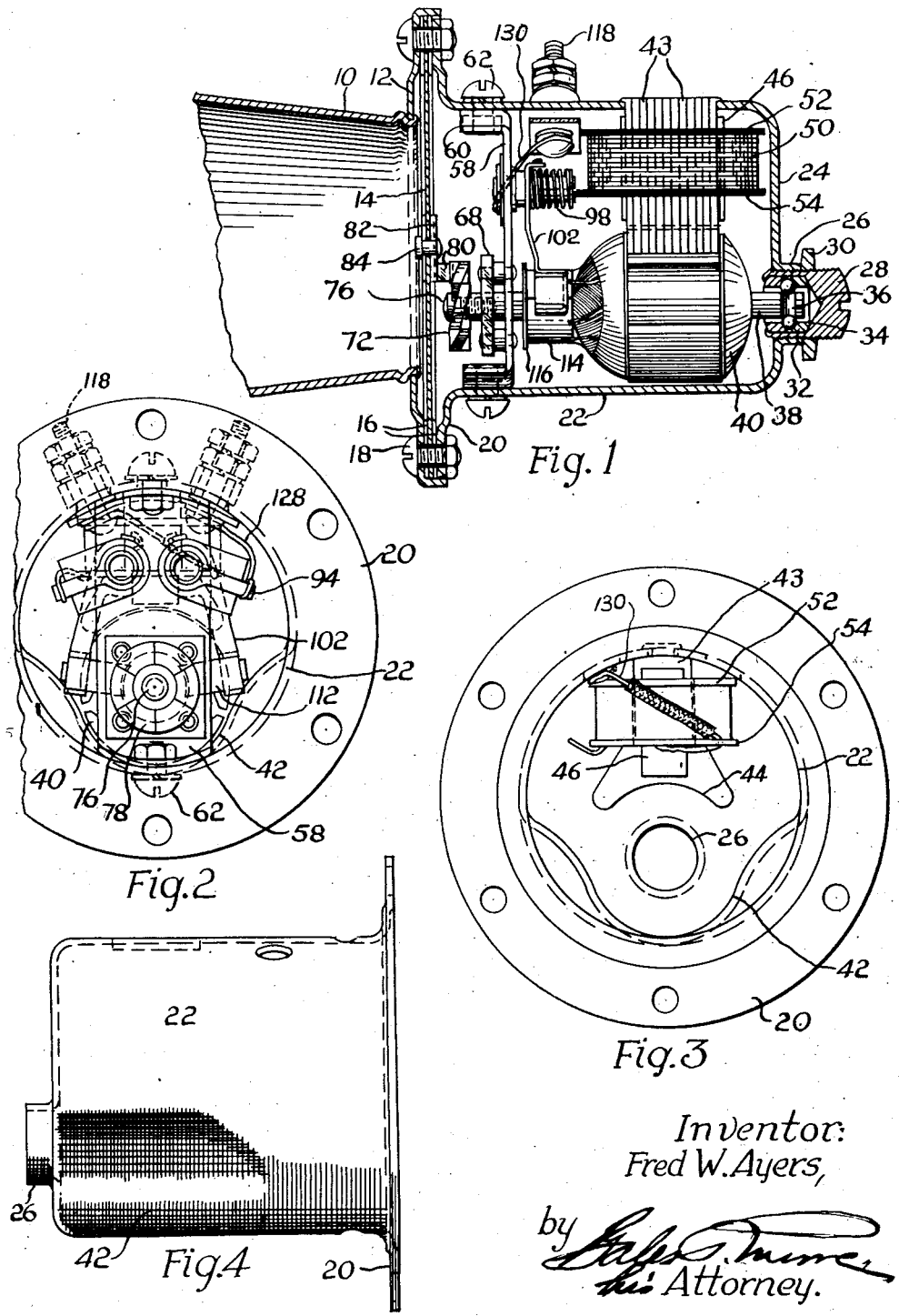

F. W. AYERS

SIGNALING DEVICE

Filed March 13, 1924     2 Sheets-Sheet 2

1,673,794

Inventor:
Fred W. Ayers,
by
his Attorney.

Patented June 19, 1928.

1,673,794

UNITED STATES PATENT OFFICE.

FRED W. AYERS, OF EAST ORANGE, NEW JERSEY, ASSIGNOR, BY MESNE ASSIGNMENTS, TO DELCO-REMY CORPORATION, OF DAYTON, OHIO, A CORPORATION OF DELAWARE.

SIGNALING DEVICE.

Application filed March 13, 1924. Serial No. 698,916.

This invention relates to electrical motors and particularly such motors as are used to operate signaling devices or diaphragm horns for automobiles and the like.

Diaphragm horns, as at present constructed, usually have a motor the shaft of which carries a cam with toothed projections which strike repeatedly against a diaphragm. When the motor is eccentrically placed with respect to the center of the diaphragm, one of the field poles of the motor is so far from the center of the diaphragm that the enclosing casing must be unduly large or else is eccentric with respect to the horn or projector. If the motor shaft is centrally mounted, the cam projections are out of line with the middle of the diaphragm and transmission of vibrating impulses to the diaphragm is less efficient. Horn motors having a supporting frame behind the diaphragm require a separate shell or casing to enclose and protect the motor and all of these features lead to expense and prevent a simple and compact arrangement.

One of the objects of this invention, therefore, is to provide a horn which will eliminate the above mentioned and other disadvantages. In the illustrated construction, this is accomplished by utilizing a portion of the enclosing shell or casing as one of the poles and by eliminating one of the field windings.

Another object is to provide an efficient horn which can be manufactured at low cost. Another object is to provide an improved mounting for the brushes. Yet another object is to provide an improved mounting for the motor shaft.

To these ends and also to improve generally upon devices of the character indicated my invention consists in the various matters hereinafter described and claimed.

Referring to the drawings, Figure 1 is a vertical section of the horn.

Figure 2 is an end view of the motor casing with the diaphragm and projector removed.

Figure 3 is an end view of the motor casing with the field pole and coil attached thereto.

Figure 4 is a side view of the motor casing.

Figure 5:
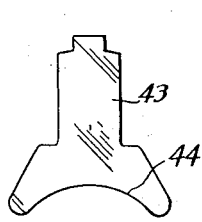
Figure 5 is a view of one of the laminated pieces of the field pole.

In Figure 1, 10 is the usual projector attached at its inner end to a surrounding collar 12, and 14 is a diaphragm having gaskets 16 on each side at the periphery. The diaphragm and its gaskets are clamped by bolts 18 between the collar 12 and a flange 20 extended outwardly from a substantially cylindrical casing or shell 22. The shell is substantially cup-shaped with an end wall 24 having a cylindrical drawn portion 26 threaded on the inside to receive a screw plug 28, the latter being held in adjusted position by a nut 30. Within the plug are race rings 32 between which is inserted a row of balls 34 entering a groove 36 at the end of a motor shaft 38.

Figure 6:
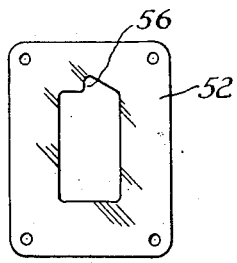
Figure 6 is a plan view of one of the coil heads of the field coil.
Figures 7, 8:
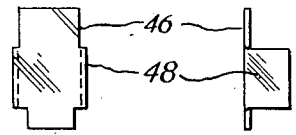
Figure 7 is a front view of one of the insulating plates for the field coil and Figure 8 is a side view of the same.
Figure 9:
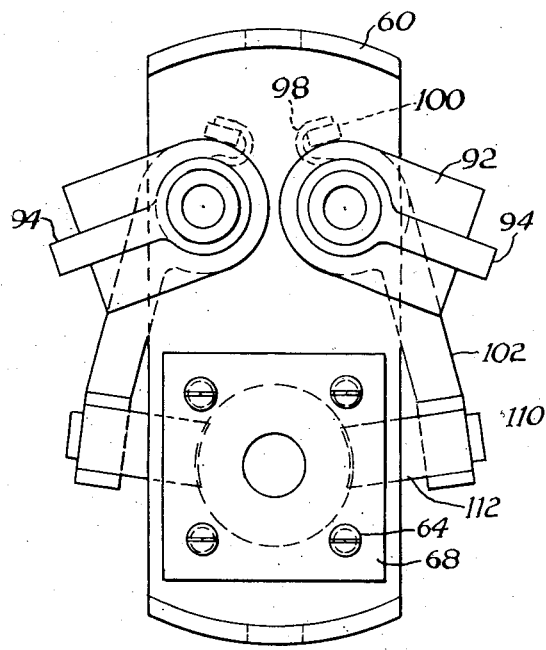
Figure 9 is an enlarged view of the bridge piece and associated parts and Figure 10 is a side view of the same.
Figure 10:
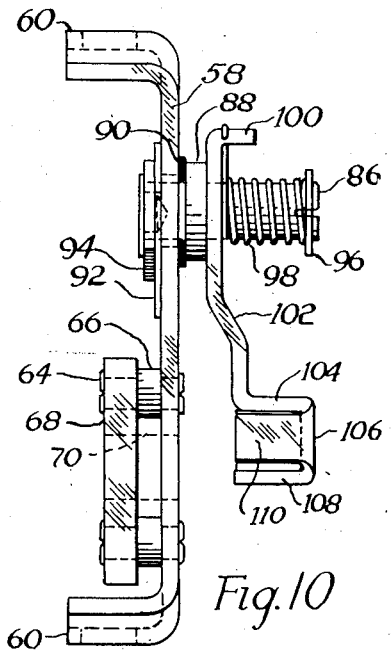
Figures 11, 12:
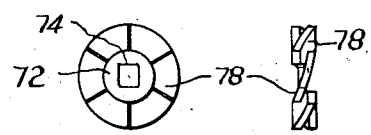
Figure 11 is an end view of the cam or rotor and Figure 12 is a side view of the same.
Figure 13:
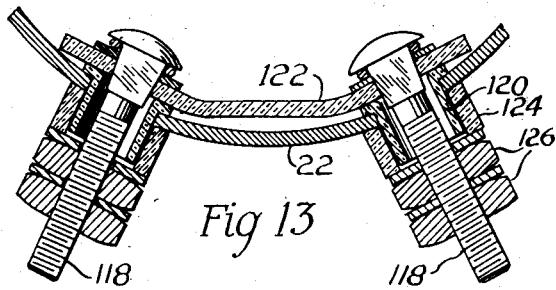
Figure 13 is an enlarged sectional view showing the terminal screws and associated parts.

An armature 40 is carried by the shaft and conforms at its periphery to a pressed-in portion 42 of the motor shell. Opposite to the pressed-in portion of the shell, there is rigidly attached a field pole 43 composed of laminated pieces, the reduced ends of which are riveted to the shell. As indicated at 44 in Figures 3 and 5, the lower ends of the pieces are enlarged and conform closely to a portion of the periphery of the armature. Insulating plates 46 engage the sides of the endmost pieces of the pole and have side flanges 48 extending along the edges of the said pieces. A field coil 50, which is substantially square, surrounds the insulating plates and pole 43 and has an upper coil head 52 and a lower coil head 54, each having a notch 56, as shown in Figure 6, for the passage of the coil winding. From this construction, it will be seen that the motor shell itself provides a path for the magnetic flux between the laminated field pole and the pole formed by the pressed-in part of the shell. The armature can thus be arranged on one side of the center of the diaphragm and the single field pole on the other, thus making it possible to have the motor shell concentric with the projector or horn without having a casing of excessive size. Furthermore, no separate frame is required to support the parts of the motor and the shell itself forms the enclosure to protect the motor. This arrangement, as will afterward appear, also positions the end of the motor shaft in a position such that the blows can be conveniently and easily transmitted to the diaphragm.

For supporting the other end of the motor shaft and the associated parts, a cross bar or bridge piece 58 having offset curved ends 60 is united to the periphery of the shell by the bolts 62. A series of four studs 64 with intermediate collars 66 are attached to the lower part of the bridge piece and have their ends passed through openings in the corners of a square bearing plate 68, preferably made of hard fiber. Within the space between the plate 68 and the bridge piece, and inside of the spacing collars 66, is inserted a felt washer 70 which may be impregnated with oil to lubricate the shaft where it passes through the plate 68.

A cam or rotor 72 is attached to the end of the motor shaft by a screw 76 which passes through a square opening 74 in the rotor and is threaded in a tapped opening of the shaft. The cam or rotor comprises a disc having sections around the periphery twisted out of the plane of the body of the disc to form opposite inclined cam faces 78 arranged to successively engage a projection or lug 80 struck up from a wear piece 82 fastened to the center of the diaphragm by a rivet 84. This construction of the rotor renders it reversible so that, when worn, it can be removed and used the other way out.

A pair of studs 86 having collars 88 are fastened to the bridge piece by riveting and are insulated from the latter by insulating bushings 90. A layer of insulation 92 against the bridge piece insulates it from a terminal 94 held on each stud by the upset end of the latter. A limit washer 96 sleeved on each stud 86 serves as an abutment for a coil spring 98 helically wound around the stud, the spring having one end bent into a slot in the end of the stud and having its other end bent around a lug 100 on a brush arm 102. The spring acts as a combined torsion and expansion spring to hold the brush arm in alignment with the end face of the collar 88 and to press the brush against the commutator. The brush arms 102 hang downwardly at the sides of the motor shaft and each has a portion bent inwardly at 104, downwardly at 106 and outwardly at 108 to embrace a brush 112. A tongue 110 bent up from the portion 106 engages the end of the brush and holds it against a commutator 114. At one side of the commutator there is an oil throw washer 116 to prevent oil that may work inwardly along the shaft from the bearing from reaching the commutator.

The terminal screws 118 are preferably placed at the top of the motor casing and are insulated therefrom by the bushings 120. A strip of insulation 122 bridges the terminal screws and an outer insulating bushing 124 insulates the motor casing from the binding nuts 126 threaded on the terminal screws. The lead wire 128 (see Figures 1, 2 and 3) extends from one of the terminal screws to one of the terminals 94 connected to a brush and a wire 130 from the other brush terminal 94 traverses the field winding and has its end connected to the other terminal screw 118. The pole having the surrounding field winding is preferably placed at the top of the motor casing so that gravity acting on the armature will tend to compensate for the weaker pole formed by the pressed-in portion of the casing and thus maintain a uniform air gap.

Although the invention has been described by reference to a specific construction, it should be understood that, in its broader aspects, it is not necessarily limited to the construction selected for illustrative purposes.

I claim:

1. In a device of the character described, a substantially cylindrical shell, an armature and shaft mounted in said shell at one side of its central axis, a field pole on the other side of said axis and united to said shell, a bearing support for one end of the armature shaft, a cross piece furnishing a bearing support for the other end of the armature shaft, a commutator on the shaft adjacent to the cross piece, brushes pivotally mounted on said cross piece and bearing against said commutator, and means for energizing said field pole; substantially as described.

2. A device of the character described, comprising in combination, a cup-shaped housing comprising a substantially cylindrical portion provided with an end wall; an armature and shaft mounted in said housing at one side of its central axis; a field pole secured to the cylindrical portion of the housing on the other side of said axis; a bearing support for one end of the armature, carried by the end wall; a cross-piece in said housing providing a support for the other end of the shaft; a commutator; brush holders pivotally supported on the cross-piece adjacent the portion of the housing to which the field pole is secured; brushes carried by the said brush holders so as to engage the commutator; and means for energizing said field pole.

In testimony whereof I hereunto affix my signature.

FRED W. AYERS.